UNITED STATES PATENT OFFICE.

HERBERT W. C. TWEDDLE, OF PITTSBURG, PENNSYLVANIA.

IMPROVEMENT IN PETROLEUM PRODUCTS AND METHODS OF OBTAINING THE SAME.

Specification forming part of Letters Patent No. 189,402, dated April 10, 1877; application filed July 31, 1876.

*To all whom it may concern:*

Be it known that I, HERBERT W. C. TWEDDLE, of Pittsburg, in the county of Allegheny and State of Pennsylvania, have invented a new and useful Improvement in Petroleum Products and Methods of Obtaining the Same; and I do hereby declare the following to be a full, clear, and exact description thereof.

My invention relates to a new petroleum product, which I term "petrozcene," and to methods of obtaining the same.

In the distillation of crude petroleum by the usual processes, with either steam or fire heat, a residuum or tarry matter remains, or is left in the still, to the extent of from four (4) to ten (10) per cent. of the original quantity of (48° or similar gravity) oil treated.

This tarry residuum of the first distillation is subsequently redistilled to recover the contained paraffine, and during the latter stages of this second distillation an orange-colored resinous oily matter is driven over, which is separated, and has heretofore been considered as valueless, except as a lubricant for mill machinery, or for like purposes.

The amount of orange-colored resinous oily matter given off from a charge of say two thousand (2000) gallons of residuum, during the latter stage of distillation, will vary from one hundred (100) to two hundred (200) gallons, or from five (5) to ten (10) per cent., varying with the quality of the crude oil or tar.

It is this orange-colored resinous oily matter which I utilize, and from which I obtain the new product which I term petrozcene.

The easiest though not the best method is by simple sublimation, which is readily accomplished by opening the still toward the close of distillation when the vapor specified begins to pass over, or by conducting the said vapors into condensing-chambers such as are employed in the mercury process. In either case heavy yellow fumes will be formed, which are petrozcene mixed with some oily particles.

The method preferred by me is as follows: I take the orange-colored resinous oily product and subject it to repeated washings with either benzine or the light oils from petroleum, or even the illuminating-oils. I find benzine best adapted for the purpose, and decant the liquid, preserving the precipitate which may be further washed, purified, and dried in any of the well-known ways. This precipitate is the new product—petrozcene.

Petrozcene is of a crystalline structure, and when first obtained is usually of a yellow color, but may sometimes have a greenish tint. It is slightly transparent, and has a very peculiar fluorescence. When heated to 420° Fahrenheit or 430° Fahrenheit it melts and becomes a dark olive geen, and if heated above the melting-point it sublimes and distills over, giving off brilliant yellow fumes. It chills rapidly, and when cooling decrepitates and cracks. It is heavier than water. (Specific gravity 1.204.) Is not a good conductor of electricity. Its spectrum somewhat approaches anthracene. By subsequent treatment of this substance dyes and coloring matter are obtained.

Having thus described my invention, what I claim, and desire to secure by Letters Patent, is—

1. As a new article of manufacture, the petroleum product hereinbefore specified, and having the characteristics herein described.

2. The process herein described for obtaining a new product from petroleum, the same consisting in lixiviating the orange-colored resinous oily product obtained toward the close of the distillation of tar residuum, and recovering the precipitate, substantially as and for the purpose specified.

In testimony whereof I, the said HERBERT W. C. TWEDDLE, have hereunto set my hand.

HERBERT W. C. TWEDDLE.

Witnesses:
JAMES I. KAY,
F. W. RITTER, Jr.